United States Patent
De Smet et al.

(10) Patent No.: US 9,693,506 B2
(45) Date of Patent: Jul. 4, 2017

(54) COMBINE HARVESTER WITH ADJUSTABLE CLEANING SHOE ARRANGEMENT

(71) Applicants: CNH INDUSTRIAL BELGIUM NV, Leon Claeysstraat (BE); CNH INDUSTRIAL AMERICA LLC, New Holland, PA (US)

(72) Inventors: Tom De Smet, Maldegem (BE); Matthias Baert, Varsenare (BE); Frederik Tallir, Esen (BE); Bart M. A. Missotten, Herent (BE); Frank R. G. Duquesne, Zwevegem (BE); Luc Yde, Bassevelde (BE); Thierry E. Devriese, Bruges (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/775,368

(22) PCT Filed: Mar. 11, 2014

(86) PCT No.: PCT/EP2014/054655
§ 371 (c)(1),
(2) Date: Sep. 11, 2015

(87) PCT Pub. No.: WO2014/139988
PCT Pub. Date: Sep. 18, 2014

(65) Prior Publication Data
US 2016/0029562 A1    Feb. 4, 2016

(30) Foreign Application Priority Data
Mar. 12, 2013 (BE) ................. 2013/0159

(51) Int. Cl.
*A01F 12/30* (2006.01)
*A01F 12/44* (2006.01)
(Continued)

(52) U.S. Cl.
CPC ............ *A01F 12/448* (2013.01); *A01F 12/32* (2013.01); *A01F 12/58* (2013.01)

(58) Field of Classification Search
CPC ...... A01F 12/446; A01F 12/448; A01F 12/56; A01F 12/44; A01F 12/32; A01D 75/282; A01D 41/12; A01D 41/1276
(Continued)

(56) References Cited

U.S. PATENT DOCUMENTS 1,138,591 A * 5/1915 Hawthorne ............. A01F 12/56
209/365.2
2,212,092 A * 8/1940 Wood ...................... A01F 12/44
460/92
(Continued)

FOREIGN PATENT DOCUMENTS

DE        464474 C      8/1928
EP        1584225 A1   10/2005
(Continued)

*Primary Examiner* — Árpád Fábián-Kovács
(74) *Attorney, Agent, or Firm* — Patrick M. Sheldrake

(57) ABSTRACT

A combine harvester has a driving shoe arrangement. The driving shoe includes a preparation pan and one or more sieves, coupled to a drive mechanism for driving a reciprocating movement of the pan and sieves. The stroke of the reciprocating movement of the pan and/or sieves is adjustable, through the application of a drive mechanism including one or more pivotably mounted support arms for supporting the pan or sieve, and a drive arm connected to one of the support arms through an adjustable connection link. The adjustable connection link can be a variable length actuator whose length determines the stroke of the pan or sieve. The stroke of the pan or sieve can be adjusted during a harvesting
(Continued)

run, thereby allowing a fast adjustment to changing external conditions such as the slope of the terrain.

14 Claims, 3 Drawing Sheets

(51) Int. Cl.
*A01F 12/32* (2006.01)
*A01F 12/58* (2006.01)

(58) Field of Classification Search
USPC .................. 460/101, 102, 92, 93, 94
See application file for complete search history.

(56) References Cited

U.S. PATENT DOCUMENTS

| | | | |
|---|---|---|---|
| 4,598,718 A | 7/1986 | Glaubitz et al. | |
| 4,723,558 A * | 2/1988 | Usick | A01F 12/44 460/100 |
| 4,766,803 A | 8/1988 | Cartee et al. | |
| 4,770,190 A * | 9/1988 | Barnett | A01F 12/446 209/394 |
| 6,412,260 B1 * | 7/2002 | Lukac | A01F 12/446 460/142 |
| 7,322,882 B2 | 1/2008 | Duquesne et al. | |
| 7,553,226 B2 | 6/2009 | Dhont et al. | |
| 9,414,546 B2 * | 8/2016 | Missotten | A01D 41/12 |
| 9,456,549 B2 * | 10/2016 | Missotten | A01F 12/446 |
| 2003/0100353 A1 | 5/2003 | Wolters | |
| 2003/0186731 A1 * | 10/2003 | Voss | A01F 12/448 460/101 |
| 2006/0229119 A1 | 10/2006 | Wamhof et al. | |
| 2008/0318650 A1 * | 12/2008 | Dhont | A01D 75/282 460/101 |
| 2015/0296712 A1 * | 10/2015 | Duquesne | A01F 12/448 460/101 |
| 2015/0305243 A1 * | 10/2015 | Duquesne | A01F 12/56 460/101 |

FOREIGN PATENT DOCUMENTS

| | | |
|---|---|---|
| EP | 1817951 A1 | 8/2007 |
| JP | 09248051 A | 9/1997 |
| RU | 111964 U1 | 1/2012 |

\* cited by examiner

COMBINE HARVESTER WITH ADJUSTABLE CLEANING SHOE ARRANGEMENT

This application is the US National Stage filing of International Application Serial No. PCT/EP2014/054655 filed on Mar. 11, 2014 which claims priority to Belgian Application BE2013/0159 filed Mar. 12, 2013, each of which is incorporated herein by reference in its entirety.

FIELD OF THE INVENTION

The present invention is related to combine harvesters for gathering and processing crop material from a field, in particular to systems for driving the cleaning shoe arrangement of a combine harvester.

STATE OF THE ART

Combine harvesters are equipped with a so-called cleaning shoe, comprising a preparation pan and a set of sieves. The preparation pan is located underneath the threshing drums of the harvester. The pan receives a mixture of grains and chaff residue from which the grains need to be further separated. The preparation pan is subjected to a reciprocating movement which moves the mixture progressively towards the sieves that are placed downstream of the pan, and which are equally subjected to a reciprocating movement for sieving the mixture and finally obtaining the separated grains. Light chaff particles are removed by a blower, blowing air through the upper and lower sieve. The reciprocating movement of the preparation pan is usually actuated by a crankshaft mechanism that couples the movements of the pan and the sieves, so that the pan moves in anti-phase with the sieves.

Optimal harvesting conditions are reached when the thickness of the load carried by the preparation pan remains essentially constant. However, external circumstances may influence this thickness. One factor is the slope of the field. When harvesting uphill, the load moves faster towards the sieves as it is assisted in this movement by gravity, while downhill harvesting causes a slower progress of the load as gravity works against its movement. Both conditions cause a decrease in capacity either through an overload or through insufficient loading of the sieves.

SUMMARY OF THE INVENTION

The present invention is related to a combine harvester comprising a driving shoe arrangement wherein the stroke of the reciprocating movement of the pan and/or sieves is adjustable, through the application of a drive mechanism including one or more pivotably mounted support arms for supporting the pan or sieve, and a drive arm connected to one of said support arms through an adjustable connection means. According to a preferred embodiment, the adjustable connection means comprises a variable length actuator whose length determines the stroke of the pan or sieve. The stroke of said pan or sieve, and—according to an embodiment—together with the stroke, the throwing angle, can be adjusted during a harvesting run of the combine harvester, thereby allowing a fast adjustment to changing external conditions such as the slope of the terrain, without stopping the combine. Adjustment of the stroke can be done manually and/or automatically through sensors and control means.

The invention is in particular related to a combine harvester as described in the appended claims. In the present description and in the appended claims, the term 'reciprocating movement' indicates a 'to-and-fro' movement of a component that is not limited to movement along a straight line.

The invention is thus generally related to a combine harvester provided with a cleaning shoe arrangement, said arrangement comprising a preparation pan and one or more sieves, said preparation pan and sieves being configured to perform a reciprocating movement with respect to the chassis of the combine harvester, wherein said reciprocating movement is driven by at least one drive mechanism, each of said drive mechanisms comprising on each side of the combine harvester:

at least one pivotable support arm, said support arm being pivotable about a horizontal axis, said support arm carrying said pan or one of said sieves in a rotation point, a drive arm coupled to a drive means for subjecting said drive arm to a reciprocating movement with a constant stroke, connection means, coupled between the drive arm and the support arm so that said reciprocating movement of the drive arm drives a swinging motion of said support arm about said horizontal axis, wherein said connection means are adjustable during operation of the combine harvester, so as to modify the amplitude of said swinging motion and thereby the stroke of said pan or sieve.

DETAILED DESCRIPTION OF PREFERRED EMBODIMENTS OF THE INVENTION

Preferred embodiments will now be described with reference to the drawings. The detailed description is not limiting the scope of the invention, which is defined only by the appended claims.

Figure 1:
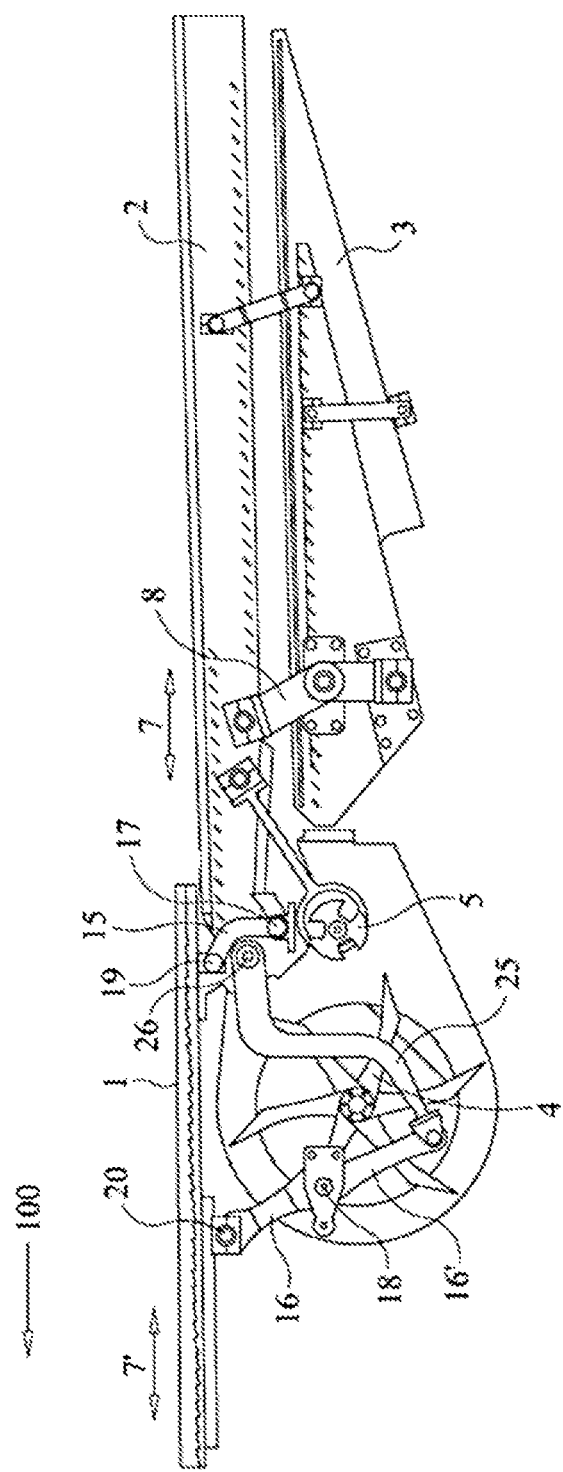
FIG. 1 shows a cleaning shoe arrangement in a combine harvester as presently known in the art.

Before describing a preferred embodiment in detail, an existing mechanical system for driving a cleaning shoe arrangement is described, with reference to FIG. 1. The invention will then be explained on the basis of an embodiment of the invention that improves the existing system.

In the system of FIG. 1, the following components have been indicated by reference numerals: the preparation pan 1, the upper and lower sieves 2 and 3, a blower 4 for blowing air through the sieves. The combine moves in the direction of arrow 100 during a harvesting run. A crankshaft 5 is mounted, and driven by a suitable motor (not shown). Through the drive rod 6, the crankshaft drives a reciprocating movement of the upper sieve 2 with respect to the harvester's chassis, indicated by the arrows 7. Via connection 8, this reciprocating movement in turn drives a reciprocating movement of the lower sieve 3. The preparation pan 1 is supported on each side by a first support arm 15 and a second support arm 16, the first arm 15 being pivotable about a first fixed horizontal axis 17, the second arm 16 being pivotable about a second fixed horizontal axis 18, said second arm 16 having a portion 16' that extends beyond the horizontal axis 18 in the direction opposite the preparation pan 1. Only the second support arm 16 plays a part in the mechanism of the invention. The first support arm may be replaced by any other equivalent support means. The pan 1 is pivotably connected to said first and second arms 15/16 in respective first and second rotation points 19 and 20. A drive arm 25 is pivotably connected to the upper sieve 2 in rotation point 26 and to the second support arm 16 in rotation point 27, the latter rotation point being located on the arm portion 16' extending in the direction opposite the pan 1. In this way, the reciprocating movement of the upper sieve 2 drives the movement of the drive arm 25, which in turns actuates a swinging motion of the second support arm 16 about the second axis 18. This swinging motion results in the reciprocating movement 7' of the preparation pan 1, in anti-phase with the movement of the upper sieve 2. The stroke of the pan and sieves is fixed. No adaptation of this stroke to external conditions is therefore possible, for example when the slope of the field causes problems as described above.

Figure 2:
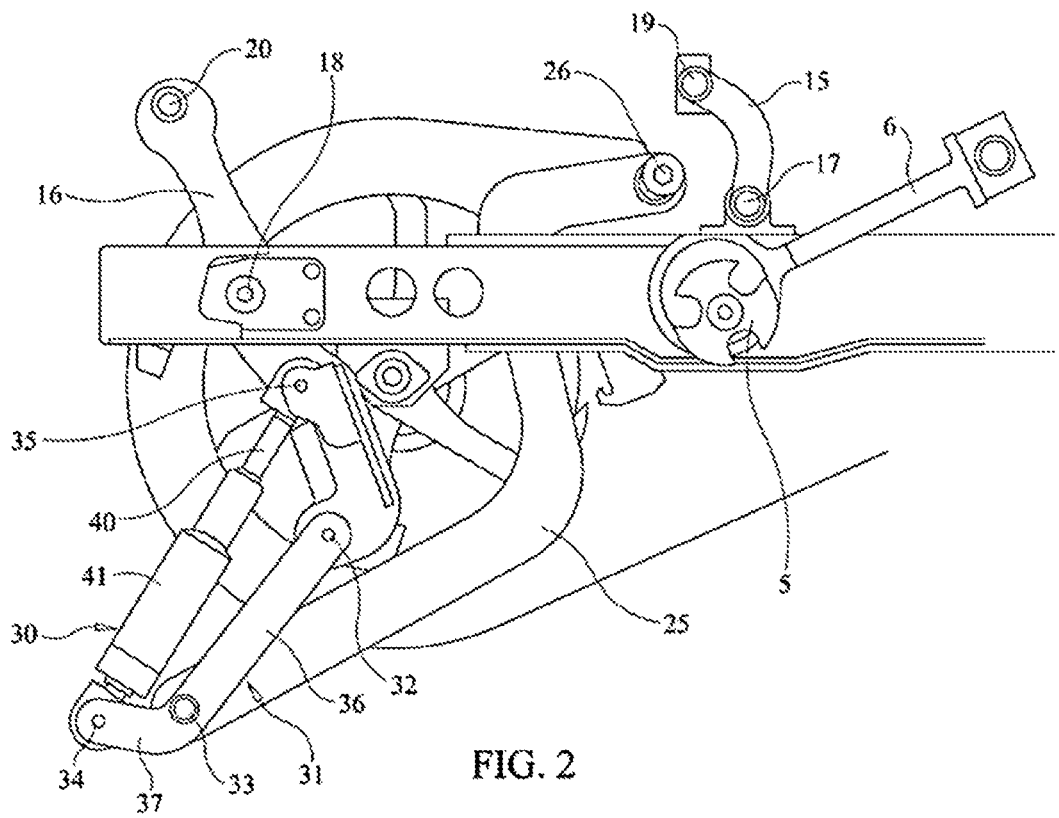
FIG. 2 shows a side view of an adjustable stroke drive mechanism for a cleaning shoe in a combine according to an embodiment of the invention.

FIG. 2 shows a detail of the preparation pan drive mechanism in a combine harvester according to an embodiment of the invention. The same components are mounted on the other side of the combine. The pan and sieves are not shown. The crank shaft 5 is once again driving the upper sieve's movement through driving rod 6, in the same way as in the existing system. Also, and again in the same way as in the system of FIG. 1, there is a first support arm 15, rotatable about fixed axis 17 and carrying the preparation pan in rotation point 19, and a second support arm 16, rotatable about fixed axis 18 and carrying the preparation pan in rotation point 20. The second arm 16 is once more provided with a portion 16' extending beyond the fixed axis 18 in the direction opposite from the pan 1. The drive arm 25 is connected to the upper sieve at rotation point 26, and further configured, as in the existing system, to transfer the sieve's reciprocating movement to an anti-phase movement of the preparation pan 1.

In the system of the invention however, the connection between the drive arm 25 and the second support arm 16 is not established by a single rotation point (point 27 in FIG. 1), but by a variable length actuator 30 and an auxiliary arm 31. Said auxiliary arm 31 is pivotably connected:

to the second support arm 16 in a first rotation point 32 located on the portion 16' of the second arm, i.e. opposite from the preparation pan 1 with respect to the second fixed axis 18, to the drive arm 25 in a second rotation point 33, to one end of the variable length actuator 30 in a third rotation point 34, with the second rotation point 33 lying between the first and third rotation points 32 and 34.

The other end of actuator 30 is connected to the second support arm 16 in a further rotation point 35 on the portion 16' of the second support arm 16, said further rotation point 35 lying between the second fixed axis 18 and the first rotation point 32. According to the preferred embodiment shown in the drawings, the auxiliary arm 31 comprises a straight portion 36 and a bent-up portion 37, with the third rotation point 34 located on the extremity of said bent-up portion, and the first and second rotation point 32/33 lying on either side of the straight portion 36.

The adjustable stroke mechanism according to the invention allows to change the stroke of the preparation pan 1 by changing the length of the actuator 30. The stroke of the upper sieve remains constant through the eccentric drive and hence the stroke of connecting point 26 remains constant.

The actuator is preferably an electrically actuated piston 40 moveable by an external power source with respect to a cylinder housing 41, but any other suitable type of actuator known in the art can be used.

Figure 3:
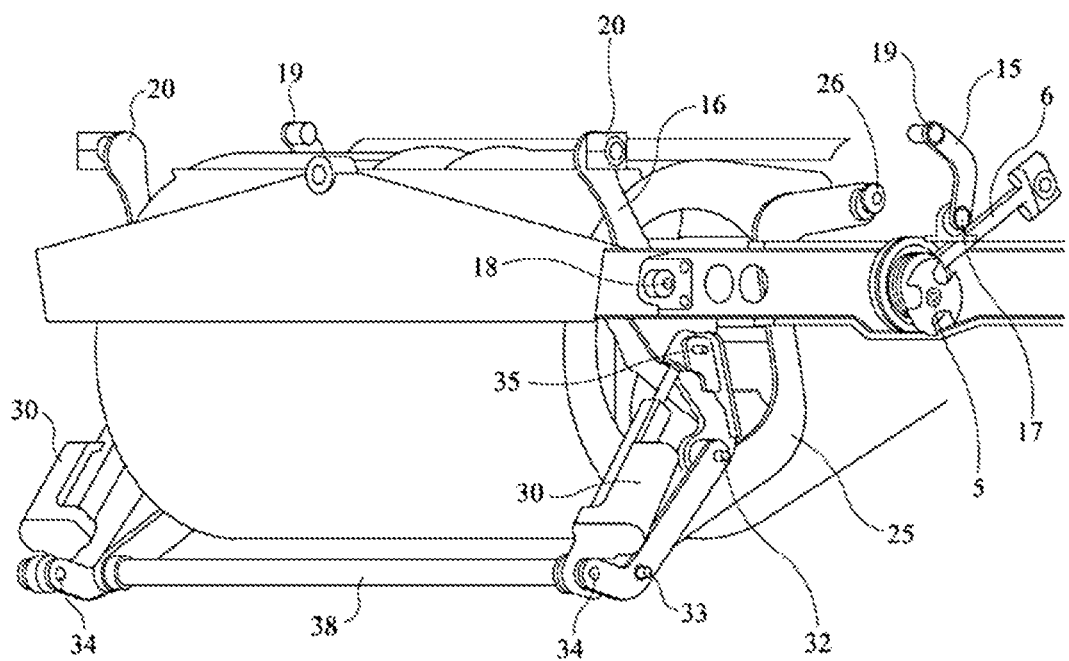
FIG. 3 shows a 3D image of the mechanism of FIG. 2, and illustrates that the same components are mounted on both sides of the harvester.

As shown in FIG. 3, the adjustable stroke mechanism is mounted on each side of the cleaning shoe arrangement. A horizontal bar 38 is preferably mounted between the two sides, connecting the rotation points 34. Synchronized activation of the actuators 30 is required in order to ensure correct operation of the cleaning shoe during and after the adjustment of the stroke.

Figure 4:
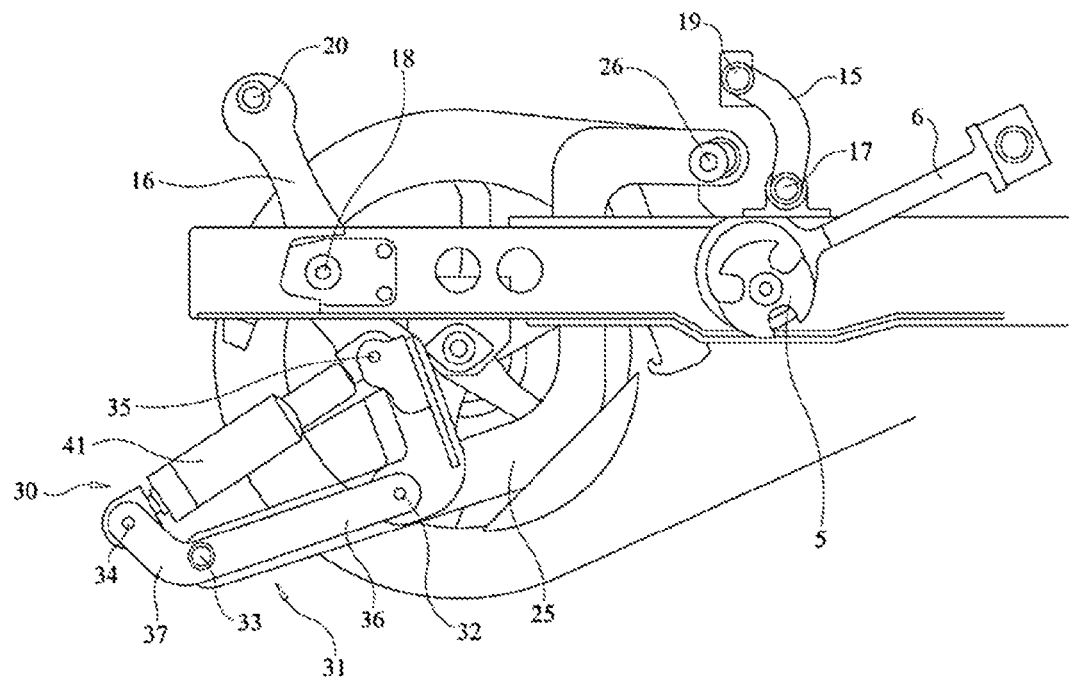
FIGS. 4 and 5 show the two extreme positions of the adjustable stroke driving mechanism of FIGS. 2 and 3.
Figure 5:
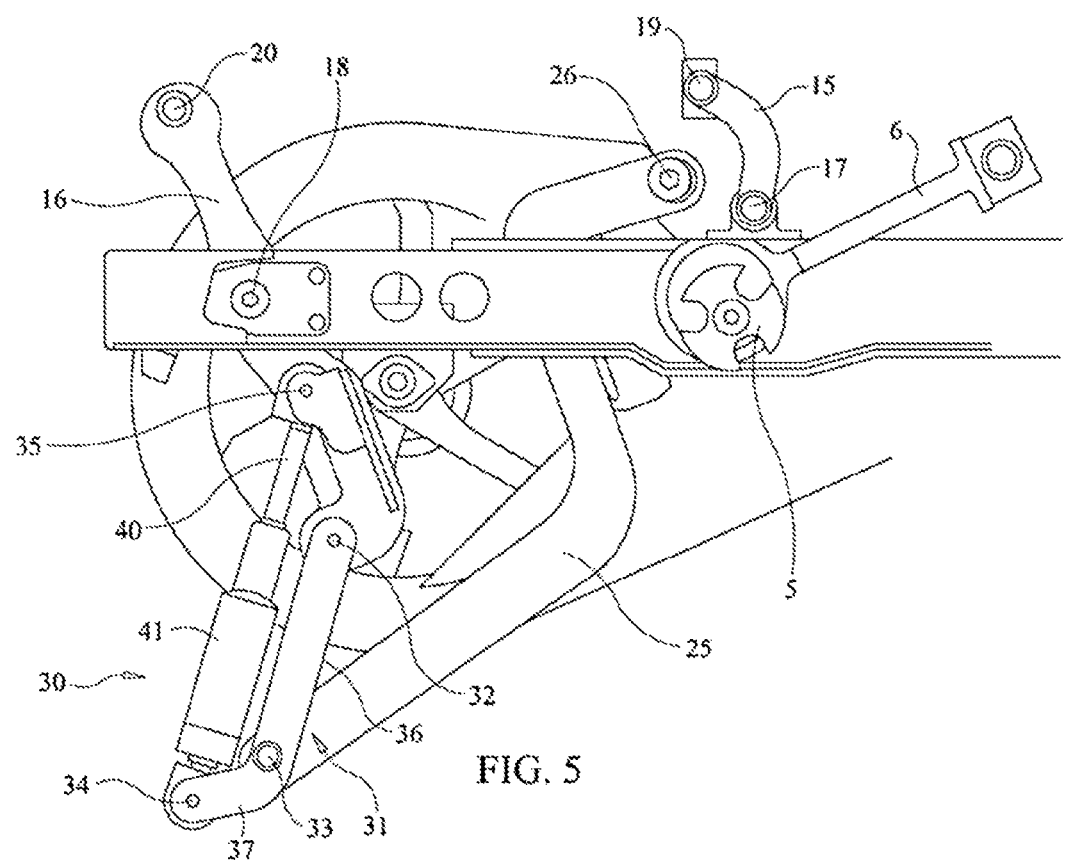

FIGS. 4 and 5 show the mechanism in the two extreme positions, obtained by fully retracting or extending the actuator respectively. In the fully retracted position shown in FIG. 4, the amplitude of the swinging motion of the second support arm 16 is maximal, leading to a maximum of the stroke of the preparation pan. In the fully extended actuator position shown in FIG. 5, the stroke is at its minimum.

By changing the length of the actuators 30 on each side of the combine, any position in between these two extremes can be established quickly and without interrupting the operation of the cleaning shoe mechanism (i.e. without stopping the rotation of crank shaft 5). This makes it possible to change the stroke 'on the go', i.e. during an on-going harvesting run, as a function of external circumstances, such as the slope of the field. For example, when harvesting uphill, the stroke may be decreased, while during downhill harvesting the stroke may be increased, in order to counter the gravity-effects described above.

It is known that the grain pan transport function is influenced by the stroke as well as by the throwing angle, being the angle of the support arm 16 relative to the vertical plane in the middle position of the support arm, i.e. in the position to the left and right of which the swinging motion of said support arm 16 takes place. Although arm 25 is shown as an S-shaped linkage it can be considered as a straight connection between points 26 and 33. If the linear distance between this straight connection and the rotation point 32 is equally divided in the maximum and minimum stroke positions shown in FIGS. 4 and 5 (i.e. when this linear distance is essentially the same in said maximum and minimum stroke positions), the throwing angle of arm 16 will remain more or less constant during the adjustment of the stroke.

According to an embodiment, the adjustable connection means is mounted in such a way that when the stroke is adjusted, the throwing angle is simultaneously adjusted, so that a larger stroke is accompanied by a larger throwing angle. In the system of FIG. 2, this can be done by choosing the position of the linkage combination of auxiliary arm 31 and actuator 30 in such a way that the linear distance between said straight connection 26-33 and the rotation point 32 is larger in the minimum stroke position than in the maximum stroke position. This will reduce the throwing angle in the minimum stroke condition. The opposite will happen in the maximum stroke condition. Then the throwing angle will be increased, resulting in more and faster transport of the crop mat on the grain pan.

The adjustment of the stroke and—if applicable—the throwing angle, may be activated manually, for example by the driver of the combine during harvesting, when the combine enters a sloped section of the field. The adjustment may also be activated by applying a control routine, wherein the length of the variable length actuators is changed on the basis of a measurement signal produced by a sensor, for example a signal representing the field slope or the thickness of the load at one or more measurement locations on the preparation pan. The combine is then provided with suitable control means known as such in the art.

In the embodiment described above and in the drawings, the adjustable stroke mechanism is mounted for adjusting the stroke of the preparation pan 1, the movement of which is driven by the reciprocating movement of the upper sieve 2, i.e. the movement of the pan and sieves is coupled. The same adjustable stroke mechanism can be mounted in a combine wherein the preparation pan's reciprocating movement is driven independently from the movement of the sieves. In such a combine, the drive arm could be driven directly in its rotation point 26 by a suitably mounted crankshaft mechanism, while a separate drive mechanism drives the sieves. According to a further embodiment, said separate drive mechanism of the sieves is equally provided with an adjustable stroke mechanism according to the invention. The latter embodiment further increases the possibilities of adjusting the operation of the cleaning shoe to external circumstances, for example to a type of crop that requires a long stroke of the preparation pan but a shorter stroke of the sieves. Finally, the adjustable stroke mechanism according to the invention may be mounted only on the sieves and not on the preparation pan.

The invention claimed is:

1. A combine harvester comprising:
   a cleaning shoe arrangement comprising a preparation pan, one or more sieves, and at least one drive mechanism, said at least one drive mechanism driving said preparation pan and said one or more sieves such that said preparation pan and said one or more sieves perform a reciprocating movement with respect to a harvester chassis, said at least one drive mechanism comprising:
      a pivotable support arm, said support arm being pivotable about a horizontal axis, said support arm carrying and being coupled to said preparation pan at a first rotation point,
      a drive arm coupled to a drive means for subjecting said drive arm to a reciprocating movement with a constant stroke,
      a connecting link coupled between the drive arm and the support arm so that said reciprocating movement of the drive arm drives a swinging motion of said support arm about said horizontal axis, a portion of said connecting link being coupled to said support arm at a second rotation point paced apart and separate from said first rotation point,
   wherein said connecting link is adjustable during operation of the combine harvester to modify the amplitude of said swinging motion and thereby the stroke of said preparation pan.

2. Combine harvester according to claim 1, wherein said connecting link comprises a variable length actuator.

3. Combine harvester according to claim 2, wherein said connecting link comprises an auxiliary arm pivotably connected:
   to said support arm at a third rotation point located opposite from the preparation pan with respect to said horizontal axis,
   to said drive arm at a fourth rotation point,
   to one end of said variable length actuator at a fifth rotation point, and wherein the other end of said variable length actuator is pivotably connected to said support arm at the second rotation point, the second rotation point being located between the horizontal axis and the third rotation point.

4. Combine harvester according to claim 1, wherein said one or more sieves comprises an upper sieve, wherein the reciprocating movement of said upper sieve is driven by a driving rod, itself driven by a crank shaft, and wherein said upper sieve is connected to said drive arm, so that the reciprocating movement of the upper sieve is transferred to the drive arm, which in turn transfers said reciprocating movement to said support arm.

5. Combine harvester according to claim 1, wherein the connecting link comprises a first connecting link positioned on one side of the combine harvester and further comprising a second connecting link positioned on an opposed side of the combine harvester, wherein a connecting rod is mounted between said first and second connecting links.

6. Combine harvester according to claim 1, wherein said drive arm is coupled to a sieve of said one or more sieves at a third rotation point and is coupled to a portion of said connecting link at a fourth rotation point spaced apart from the third rotation point such that a straight reference line is defined between the third and fourth rotation points and a linear distance is defined between the straight reference line and a fifth rotation point defined between a portion of said connecting link and said support arm, wherein said linear distance is essentially the same when said support arm is located at both a maximum stroke position and a minimum stroke position.

7. Combine harvester according to claim 1, wherein said drive arm is coupled to a sieve of said one or more sieves at a third rotation point and is coupled to a portion of said connecting link at a fourth rotation point spaced apart from the third rotation point such that a straight reference line is defined between the third and fourth rotation points and a linear distance is defined between the straight reference line and a fifth rotation point defined between a portion of said connecting link and said support arm, wherein said linear distance differs when said support arm is located at a maximum stroke position and a minimum stroke position.

8. Combine harvester according to claim 7, wherein said linear distance is larger when said support arm is located at the minimum stroke position than when said support arm is located at the maximum stroke position.

9. A combine harvester comprising:
   a cleaning shoe arrangement comprising a preparation pan, one or more sieves, and at least one drive mechanism, said at least one drive mechanism driving said preparation pan and said one or more sieves such that said preparation pan and said one or more sieves perform a reciprocating movement with respect to a harvester chassis, said at least one drive mechanism comprising:
      a pivotable support arm, said support arm being pivotable about a horizontal axis, said support arm carrying said preparation pan at a rotation point,
      a drive arm coupled to a drive means for subjecting said drive arm to a reciprocating movement with a constant stroke,
      a connecting link coupled between the drive arm and the support arm so that said reciprocating movement of the drive arm drives a swinging motion of said support arm about said horizontal axis, said connecting link comprising a variable length actuator and an auxiliary arm, said variable length actuator being adjustable during operation of the combine harvester to modify the amplitude of said swinging motion and thereby the stroke of said preparation pan, said auxiliary arm being pivotably connected:

to said support arm at a first rotation point located opposite from the preparation pan with respect to said horizontal axis, to said drive arm at a second rotation point, to one end of said variable length actuator at a third rotation point, and wherein the other end of said variable length actuator is pivotably connected to said support arm at a further rotation point located between the horizontal axis and the first rotation point.

10. Combine harvester according to claim 9, wherein said one or more sieves comprises an upper sieve, wherein the reciprocating movement of said upper sieve is driven by a driving rod, itself driven by a crank shaft, and wherein said upper sieve is connected to said drive arm, so that the reciprocating movement of the upper sieve is transferred to the drive arm, which in turn transfers said reciprocating movement to said support arm.

11. Combine harvester according to claim 9, wherein the connecting link comprises a first connecting link positioned on one side of the combine harvester and further comprising a second connecting link positioned on an opposed side of the combine harvester, wherein a connecting rod is mounted between said first and second connecting links.

12. Combine harvester according to claim 9, wherein said drive arm is coupled to a sieve of said one or more sieves at a fourth rotation point spaced apart from the second rotation point such that a straight reference line is defined between the second and fourth rotation points and a linear distance is defined between the straight reference line and the first rotation point, wherein said linear distance is essentially the same when said support arm is located at both a maximum stroke position and a minimum stroke position.

13. Combine harvester according to claim 9, wherein said drive arm is coupled to a sieve of said one or more sieves at a fourth rotation point spaced apart from the second rotation point such that a straight reference line is defined between the second and fourth rotation points and a linear distance is defined between the straight reference line and the first rotation point, wherein said linear distance differs when said support arm is located at a maximum stroke position and a minimum stroke position.

14. Combine harvester according to claim 13, wherein said linear distance is larger when said support arm is located at the minimum stroke position than when said support arm is located at the maximum stroke position.

* * * * *